A. SCHOPP.
Grain-Drill Feeder.

No. 95,149. Patented Sept. 21, 1869.

Witnesses:
William W. Herthel
Robert Burns

Inventor:
Andreas Schopp

United States Patent Office.

ANDREAS SCHOPP, OF BELLEVILLE, ILLINOIS.

Letters Patent No. 95,149, dated September 21, 1869.

IMPROVED SEED-FEEDING DEVICE FOR GRAIN-DRILLS, &c.

The Schedule referred to in these Letters Patent and making part of the same.

*To all whom it may concern:*

Be it known that I, ANDREAS SCHOPP, of Belleville, in the county of St. Clair, and State of Illinois, have made certain new and useful Improvements in Seed-Feeding Devices for Grain-Drills; and I do hereby declare the following to be a full and true description thereof, reference being had to the accompanying drawings, and to the letters of reference marked thereon.

This invention relates to the devices generally used for distributing or feeding grain to the flukes or shoes of grain-drills for planting, but said invention may find application in divers and sundry other machines of a nature similar to the foregoing.

The nature of the improvement herein made is in the use of a grooved wheel, whereon the grain is received, and which, in revolving, carries the same to a discharge, in connection with a regulating-slide and a vibrating finger, the former to gauge the quantity of grain discharged, the other to cause the grain to drop gradually and regularly into the feed-passage, and prevent clogging.

To enable those herein skilled to make and use my said improvement, I will now more fully describe the same, referring to the accompanying—

Figure 1:
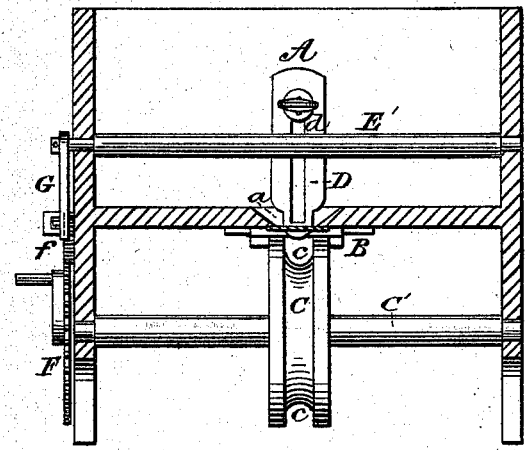
Figure 2:
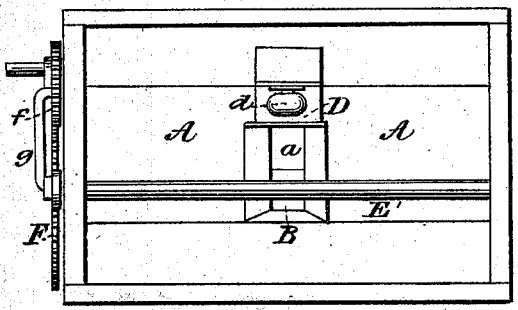
Figure 3:
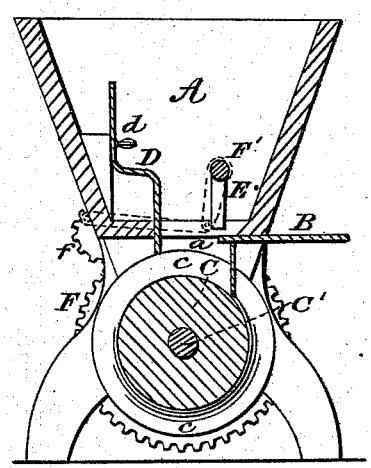

Figure 1 as a longitudinal section; to
Figure 2 as a plan; and to
Figure 3 as a transverse section, showing the said seed-feeding device as adapted for one fluke of a grain-drill.

In said figures, A represents the seed-box, wherein grain is deposited. Said box usually rests upon the frame of a grain-drill, over the flukes.

In the bottom of said box is a seed-passage, $a$, the available opening whereof is regulated by a slide, B, which may be connected in suchwise with the flukes that when these are raised out of ground, it will be closed, to check the passage of seed out of the box.

Under said opening $a$, I arrange the distributing-wheel C, upon a shaft, C', which runs transversely across the frame of the grain-drill, and is supported in proper bearings.

The wheel C has a continuous groove, $c$, being herein dissimilar to many of the distributing-wheels now in common use. The seed drops into said groove, and, as the wheel is revolved, the seed is carried back, to drop into the funnels leading to the flukes.

To regulate the quantity passing into the groove $c$, I apply the slide D, which dips more or less into said groove, as in accordance with its position, and which is held to its adjusted position by a set-screw, $d$.

In order that the seed shall not clog the opening $a$, and especially to prevent straw or dust from clogging said opening, I arrange a vibrating finger, E, upon a shaft, E', said finger being vibrated to clear said opening from obstruction by the movement of its shaft.

The shaft E' will be supported in the ends of the seed-box, and this shaft, as well as the shaft C', will be operated from the usual driving-wheel of the drill, or from any other power-source, which, by an ordinary spur-wheel, drives the wheel F upon the shaft C', to revolve said shaft.

An intermediate wheel, $f$, gears into the wheel F, and is supported, by its axle, on the seed-box.

A connecting-rod, $g$, connects said wheel $f$ with the crank G, which is upon the outer end of the shaft E', and which thus acts to vibrate the shaft as required.

In the grain-drill where there are usually seven or eight flukes, and as many distributing-devices, it will be advisable to connect the several slides D of all the seed-distributers in suchwise that they may be operated simultaneously.

The slide D will be arranged nearly or quite in the vertical plane of the axis of the shaft C'. If, therefore, the movement of the shaft C' ceases, (as when the grain-drill stands still,) the seed will be simply in the groove $c$, but, not being carried back, will not fall to the flukes. Thus the device, in a simple and effective manner, is arranged to meet the various requirements of a good seed-feeding machine. Again, as the seed is not confined in small cavities which pass closely under a housing or edge, as in many so-called "force-feed" devices, it is plain that the seed-kernels here will not be cut or broken, and thus rendered useless.

Having thus fully described my said invention,
What I claim, is—

The distributing-wheel C, arranged with continuous groove, and combined with the regulating-slide D, substantially as set forth.

ANDREAS SCHOPP.

Witnesses:
   WM. W. HERTHEL,
   ROBERT BURNS.